United States Patent
Stark et al.

(10) Patent No.: US 11,008,011 B2
(45) Date of Patent: *May 18, 2021

(54) DETECTING AND RESPONDING TO PROPULSION AND STEERING SYSTEM ERRORS FOR AUTONOMOUS VEHICLES

(71) Applicant: Waymo LLC, Mountain View, CA (US)

(72) Inventors: Ethan Stark, Sunnyvale, CA (US); Daniel Trawick Egnor, Palo Alto, CA (US); Ryan Cash, Sunnyvale, CA (US); Nolan McPeek-Bechtold, Belmont, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,017

(22) Filed: Sep. 6, 2019

(65) Prior Publication Data

US 2020/0094832 A1    Mar. 26, 2020

Related U.S. Application Data

(63) Continuation of application No. 15/718,459, filed on Sep. 28, 2017, now Pat. No. 10,569,784.

(51) Int. Cl.
*G01C 22/00* (2006.01)
*B60W 30/188* (2012.01)
(Continued)

(52) U.S. Cl.
CPC .......... *B60W 30/188* (2013.01); *B60W 10/02* (2013.01); *B60W 10/06* (2013.01);
(Continued)

(58) Field of Classification Search
CPC .... B60W 30/188; B60W 10/02; B60W 10/06; G05D 1/0066; G05D 1/0088; G05D 1/0223
See application file for complete search history.

(56) References Cited

U.S. PATENT DOCUMENTS

| | | |
|---|---|---|
| 6,463,357 B1 | 10/2002 | McCall et al. |
| 6,704,619 B1 | 3/2004 | Coleman et al. |

(Continued)

FOREIGN PATENT DOCUMENTS

| | | |
|---|---|---|
| JP | 2000339599 A | 12/2000 |
| JP | 2011240816 A | 12/2011 |

(Continued)

OTHER PUBLICATIONS

First Office Action issued in correspondence Chinese Patent Application No. 201880062928.9 dated Sep. 7, 2020.

(Continued)

*Primary Examiner* — Adam M Alharbi
(74) *Attorney, Agent, or Firm* — Botos Churchill IP Law

(57) ABSTRACT

Aspects of the disclosure relate to stopping a vehicle. For instance, a vehicle is controlled in an autonomous driving mode by generating first commands for acceleration control and sending the first commands to an acceleration and/or steering actuator of an acceleration system of the vehicle in order to cause the vehicle to accelerate. Acceleration and/or orientation of the vehicle is monitored while the vehicle is being operated in an autonomous driving mode. The monitored acceleration and/or orientation is compared with the first commands. An error with the acceleration and/or steering system is determined based on the comparison. When the error is determined, the vehicle is controlled in the autonomous driving mode by generating second commands which do not require any acceleration and/or steering.

20 Claims, 17 Drawing Sheets

(51) Int. Cl.
  *G05D 1/00* (2006.01)
  *B60W 10/06* (2006.01)
  *B60W 10/02* (2006.01)
  *G05D 1/02* (2020.01)

(52) U.S. Cl.
  CPC ......... *G05D 1/0066* (2013.01); *G05D 1/0088* (2013.01); *G05D 1/0223* (2013.01); *B60W 2520/105* (2013.01); *G05D 2201/0212* (2013.01)

(56) References Cited

U.S. PATENT DOCUMENTS

| | | | |
|---|---|---|---|
| 2010/0292873 A1* | 11/2010 | Duggan | B64C 39/024 701/11 |
| 2012/0072075 A1 | 3/2012 | Choe et al. | |
| 2012/0173043 A1 | 7/2012 | Kobashi et al. | |
| 2016/0068103 A1 | 3/2016 | McNew et al. | |
| 2017/0096138 A1 | 4/2017 | Reiff et al. | |
| 2017/0154225 A1 | 6/2017 | Stein | |
| 2017/0199523 A1 | 7/2017 | Barton-Sweeney et al. | |
| 2017/0225689 A1 | 8/2017 | Mukai | |
| 2018/0162390 A1 | 6/2018 | Miura et al. | |
| 2018/0194364 A1 | 7/2018 | Asakura et al. | |
| 2020/0257292 A1* | 8/2020 | Zhao | B60W 10/184 |

FOREIGN PATENT DOCUMENTS

| | | |
|---|---|---|
| JP | 2014151798 A | 8/2014 |
| JP | 2016016735 A | 2/2016 |
| JP | 2016084093 A | 5/2016 |
| JP | 2016094038 A | 5/2016 |
| JP | 2017100513 A | 6/2017 |
| JP | 2017124660 A | 7/2017 |
| JP | 2017142679 A | 8/2017 |
| KR | 101145112 B1 | 5/2012 |
| KR | 101579672 B1 | 12/2015 |
| WO | 2014148976 A1 | 9/2014 |
| WO | 2016194157 A1 | 12/2016 |
| WO | 2017010264 A1 | 1/2017 |

OTHER PUBLICATIONS

Search Report and Written Opinion from corresponding Singapore Patent Application No. 11202002236S dated Sep. 16, 2020, 12 pages.

"International Search Report and Written Opinion received for PCT Patent Application No. PCT/US2018/052610, dated Jan. 10, 2019", 10 pages.

Japanese Office Action for Application No. JP2020-513865 dated Mar. 12, 2021.

Singapore Office Action for Application No. SG11202002236S dated Mar. 15, 2021.

* cited by examiner

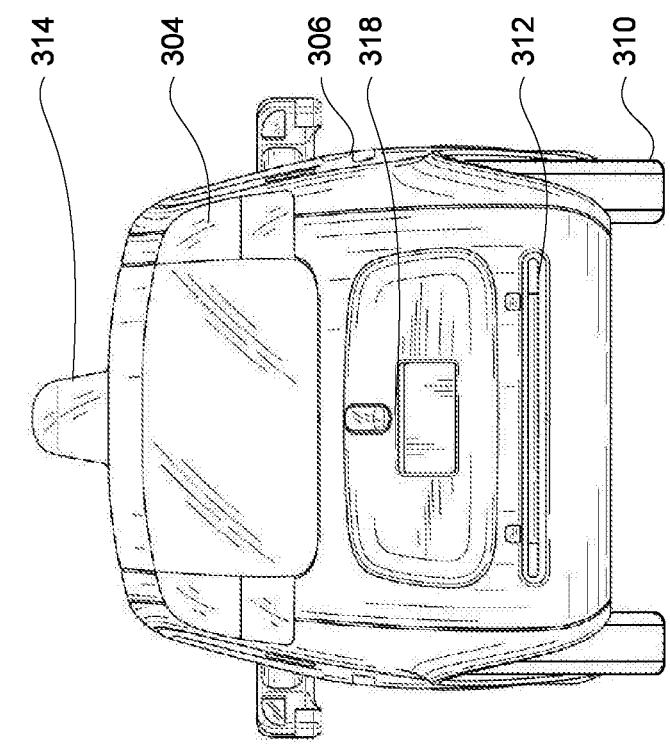
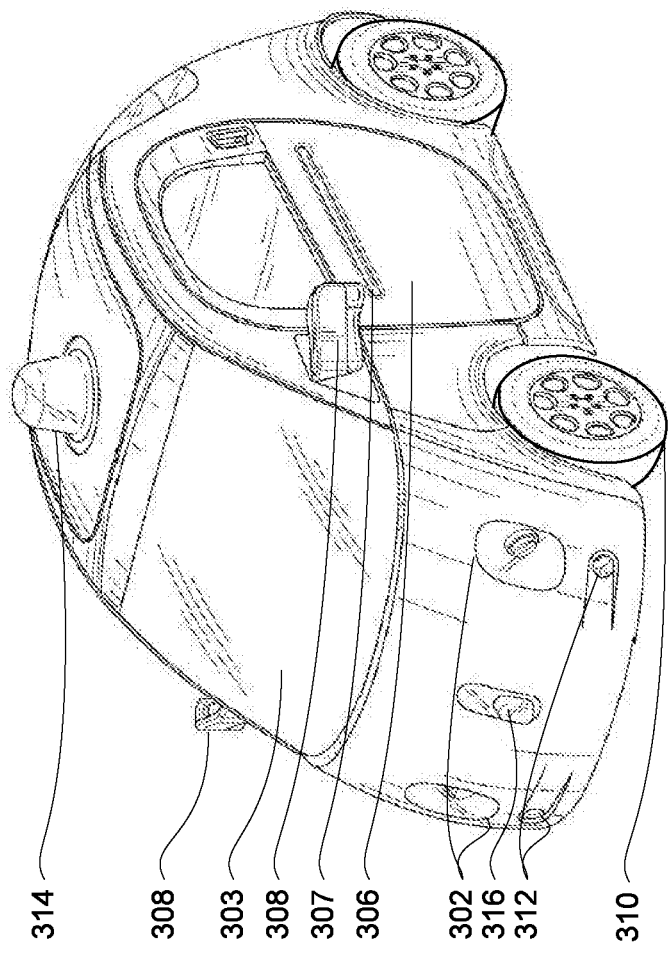
FIGURE 3C
FIGURE 3B

DETECTING AND RESPONDING TO PROPULSION AND STEERING SYSTEM ERRORS FOR AUTONOMOUS VEHICLES

CROSS-REFERENCE TO RELATED APPLICATIONS

The present application is a continuation of U.S. patent application Ser. No. 15/718,459, filed Sep. 28, 2017, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location controlled by a control system.

On rare occasions, the control system may detect errors in the propulsion system caused by a lack of acceleration or unintended acceleration. For instance, mechanical failures or errors in signal processing may result in a total loss of acceleration or even too much acceleration. The result may be a situation in which the vehicle's control computing devices are unable to safely maneuver the vehicle to reach a desired destination. Some vehicles may notify a driver and switch to a manual driving mode. However, if the driver is not responsive or a manual driving mode is not available (not operational or simply not a mode of the vehicle), this solution is ineffective.

BRIEF SUMMARY

One aspect of the disclosure provides a method of stopping a vehicle. The method includes controlling, by one or more control computing devices, the vehicle in an autonomous driving mode by generating first commands for acceleration control and sending the first commands to an acceleration actuator of an acceleration system of the vehicle in order to cause the vehicle to accelerate; monitoring acceleration of the vehicle while the vehicle is being operated in an autonomous driving mode; comparing the monitored acceleration with the first commands; determining that there is an error with the acceleration system based on the comparison; and when the error is determined, controlling, by the one or more control computing devices, the vehicle in the autonomous driving mode by generating second commands which do not require any acceleration by the acceleration system.

In one example, the monitoring and determining are performed by a monitor computing device, and the method also includes using the comparison to generate a signal indicating the error and sending the signal to the one or more control computing devices. In this example, the signal indicates that there is too much acceleration. In addition, the method also includes receiving, by the one or more control computing devices, the signal and in response to receiving the signal, turning off an ignition of the vehicle. In addition, the method also includes receiving, by the one or more control computing devices, the signal; and in response to receiving the signal, moving a gear control to a neutral state thereby disengaging a transmission of the vehicle. In addition or alternatively, signal indicates that there is not enough acceleration. In another example, the method also includes determining a first trajectory for maneuvering the vehicle by a planning system of the vehicle, wherein generating the first commands is based on the trajectory, and when the error is detected, changing a planning behavior of the planning system. In this example, the method also includes, after changing the planning behavior of the planning system, determining a second trajectory for maneuvering the vehicle according to the changed planning behavior, and wherein the second commands are generated based on the second trajectory.

Another aspect of the disclosure provides a method. The method includes controlling, by one or more control computing devices, the vehicle in an autonomous driving mode by generating first commands for steering control and sending the first commands to a steering actuator of a steering system of the vehicle in order to cause the vehicle to change orientation; monitoring orientation of the vehicle while the vehicle is being operated in an autonomous driving mode; comparing the monitored orientation with the first commands; determining that there is an error with the steering system based on the comparison; and when the error is determined, controlling, by the one or more control computing devices, the vehicle in the autonomous driving mode by generating second commands which do not require any change in the vehicle's orientation by the steering system.

In one example, the monitoring and determining are performed by a monitor computing device, and the method also includes using the comparison to generate a signal indicating the error and sending the signal to the one or more control computing devices. In another example, the method also includes determining a first trajectory for maneuvering the vehicle by a planning system of the vehicle, wherein generating the commands is based on the trajectory, and when the error is detected, changing a planning behavior of the planning system. In this example, the method also includes, after changing the planning behavior of the planning system, determining a second trajectory for maneuvering the vehicle according to the changed planning behavior, and wherein the second commands are generated based on the second trajectory.

Another aspect of the disclosure provides a system for stopping a vehicle. The system includes one or more control computing devices configured to control the vehicle in an autonomous driving mode by generating first commands for acceleration control and sending the first commands to an acceleration actuator of an acceleration system of the vehicle in order to cause the vehicle to accelerate. The system also includes a monitoring computing device configured to monitor acceleration of the vehicle while the vehicle is being operated in an autonomous driving mode, compare the monitored acceleration with the first commands, and determine that there is an error with the acceleration system based on the comparison. The one or more control computing devices are further configured to, when the error is determined, control the vehicle in the autonomous driving mode by generating second commands which do not require any acceleration by the acceleration system.

In one example, the monitoring computing device is further configured to use the comparison to generate a signal indicating the error and send the signal to the one or more control computing devices. In this example, the signal indicates that there is too much acceleration. In addition, the one or more control computing devices are further configured to receive the signal; and in response to receiving the signal, turn off an ignition of the vehicle. In addition or alternatively, the one or more control computing devices are further configured to receive the signal and in response to receiving the signal, move a gear control to a neutral state thereby disengaging a transmission of the vehicle. In another example, the signal indicates that there is not enough acceleration. In another example, the one or more control computing devices are further configured to determine a first trajectory for maneuvering the vehicle by a planning system of the vehicle, wherein generating the first commands is based on the trajectory, when the error is detected, changing a planning behavior of the planning system, and after changing the planning behavior of the planning system, determining a second trajectory for maneuvering the vehicle according to the changed planning behavior, and the second commands are generated based on the second trajectory. In another example, the system also includes the vehicle.

BRIEF DESCRIPTION OF THE DRAWINGS

FIGS. 3A-3D are example external views of a vehicle in accordance with aspects of the disclosure.

DETAILED DESCRIPTION

Overview

Figure 1A:
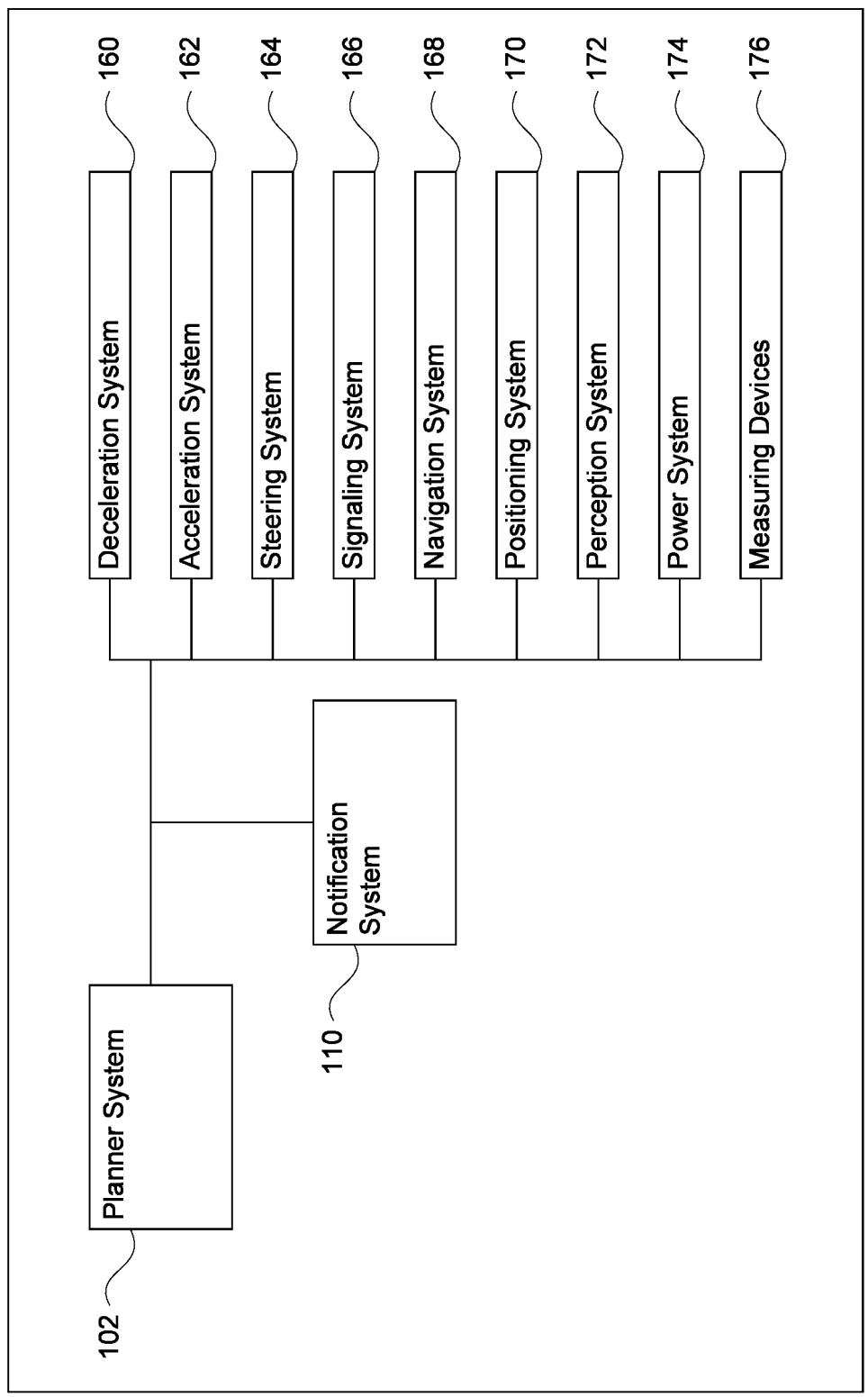
FIGS. 1A and 1B are functional diagrams of an example vehicle and notification system in accordance with aspects of the disclosure.

As noted above, an autonomous vehicle's control system may detect errors in the vehicle's propulsion system caused by a lack of acceleration or unintended acceleration. This can be especially problematic when the vehicle is in the middle of executing a maneuver such as a merge or a lane change where continuing to execute the maneuver without any acceleration available or with too much acceleration or where there are other objects such as vehicles, bicyclists, pedestrians, etc. proximate to the vehicle. Accordingly, identifying and addressing such errors immediately is a critical function for these vehicles. To identify such errors, information from the acceleration system can be compared to instructions generated by one or more control computing devices of the vehicle's planner system to determine if an error is present and respond accordingly.

For instance, a monitor computing device, separate or incorporated into the control computing devices, may monitor the condition of one or more aspects of the acceleration or steering systems of the vehicle. This information may include the current state of the vehicle's acceleration and orientation of the vehicle's wheels as well as current changes in the acceleration or orientation.

The planner system may determine how the vehicle should move through its environment in the short term in order to reach a destination location. For example, planner system may use information from a perception system of a vehicle as well as a route generated by a routing system to determine how to safely maneuver around objects, through intersections, etc. in order to reach the destination. The planner system then sends a corresponding trajectory to one or more of the control computing devices which executes the trajectory by sending instructions or commands to the various actuators of the propulsion system (deceleration and acceleration) and steering system. The monitor computing device may also monitor these commands as they are sent by the planner system or received by the control computing devices.

The monitor computing device may then compare the current state of the vehicle's acceleration and orientation with the commands generated by the one or more control computing devices to determine if there is a mismatch. For instance, if the difference between the current state of the vehicle's acceleration and the commands is greater than a threshold value, the control computing devices may determine that there is a mismatch. If there is a mismatch, the monitor computing device may detect a failure. Once detected, the monitor computing device may send a signal to the control computing devices of the planner system.

The control computing devices may use the signal to determine how to react to the error. In some instances, the control computing devices may respond by changing the planner system's behavior. This may include generating a plan for stopping the vehicle safely which does not include any acceleration or steering. In other instances, the control computing devices may take some other action such as increasing or decreasing the vehicle's acceleration. This may prevent the vehicle from stopping without propulsion where unnecessary, for instance, where the error was transient.

The features described herein may allow a vehicle operating in an autonomous driving mode to effectively identify errors in a propulsion system and to respond in order to safely stop the vehicle. Moreover, these features allow the vehicle to do so without requiring that the vehicle be switched to a manual driving mode or otherwise controlled by a human driver. In addition, this approach allows a vehicle's planner system to determine what maneuvers the vehicle is capable of completing, or in other words takes into account the change in vehicle capability, as soon as possible, and then allows the planner system to control the vehicle safely by attempting to execute only those maneuvers.

Example Systems

Figure 1B:
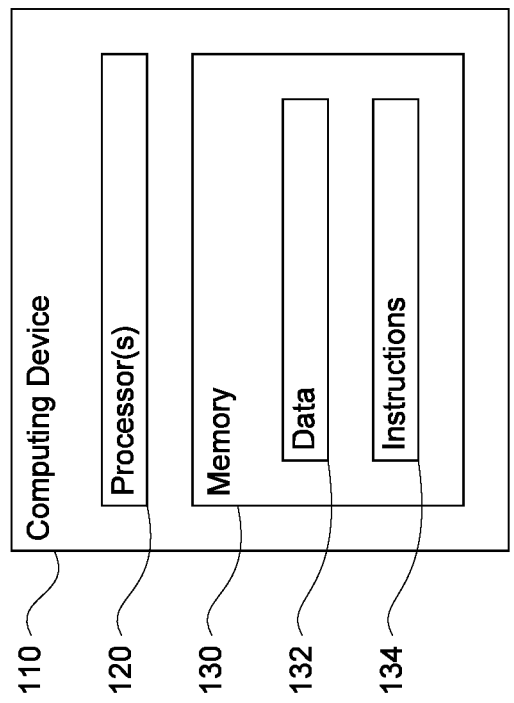

As shown in FIG. 1A, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices as shown in FIG. 1B.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 2 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may function as a monitoring system in order to monitor the status of the steering, deceleration, and acceleration systems of vehicle 100. In this regard, computing device 110 may be able to monitor information or messages sent by different systems of vehicle 100. As will be understood, each of these systems, including, for example, planner system 102, deceleration system 160, acceleration system 162, steering system 164, signaling system 166, navigation system 168, positioning system 170, and perception system 172 may include one or more processors and memory storing data and instructions configured as described above with regard to processors 120, memory 130, data 132, and instructions 134.

Computing device 110 may monitor information sent and received by the planner system 102. In this example, planner system 102 may be part of an autonomous driving computing system incorporated into vehicle 100 configured to communicate with different systems and computing devices of the vehicle. For example, returning to FIG. 1A, planner system 102 may include one or more control computing devices in communication with various systems of vehicle 100, such as deceleration system 160, acceleration system 162, steering system 164, signaling system 166, navigation system 168, positioning system 170, perception system 172 and power system 174 (for instance, a gasoline or diesel engine or an electric motor) in order to control the movement, speed, etc. of vehicle 100. The planner system 102 and/or computing devices 110 may also receive information from these systems about their current status, for instance, the position of the accelerator input (accelerator pedal) of the acceleration system 162, torque signals from the power system 174, as well as diagnostic signals from the engine or motor and other system errors or malfunction indicators such as a check engine light, etc. In addition, the vehicle may include one or more measuring devices 176, such as accelerometers, gyroscopes, and/or speedometers that can provide feedback about the current status of the vehicle, tires or tire rotation, wheel or wheel rotation, axles, etc., to the planner system 102 and/or computing devices 110. Again, although these systems are shown as external to planner system 102 and computing device 110, in actuality, these systems may also be incorporated into planner system 102 and computing device 110, again as part of an autonomous driving computing system for controlling vehicle 100.

In some instances, if the messages are sent over an Ethernet or CAN bus direct wiring or other means, the computing device 110 may be connected to the Ethernet or CAN bus, wiring, etc. in order to allow for the monitoring.

As an example, planner system 102 may interact with one or more actuators of the deceleration system 160 and/or acceleration system 162, such as brakes, the engine or motor of the vehicle, in order to control the speed of the vehicle. Similarly, one or more actuators of the steering system 164 may be used by planner system 102 in order to control the direction of vehicle 100. For example, if vehicle 100 is configured for use on a road, such as a car or truck, the steering system may include components to control the angle of wheels to turn the vehicle. Signaling system 166 may be used by planner system 102 in order to signal the vehicle's intent to other drivers or vehicles, for example, by lighting turn signals or brake lights when needed.

Navigation system 168 may be used by planner system 102 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information.

Positioning system 170 may be used by planner system 102 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with planner system 102, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the planner system 102, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by planner system 102. In the case where the vehicle is a small passenger vehicle such as a car, the car may include a laser or other sensors mounted on the roof or other convenient location.

The planner system 102 may control the direction and speed of the vehicle by communicating with the various systems and components of the vehicle. By way of example, planner system 102 may navigate the vehicle to a destination location completely autonomously using data from the detailed map information and navigation system 168. Planner system 102 may use the positioning system 170 to determine the vehicle's location and perception system 172 to detect and respond to objects when needed in order to generate a short term plan for maneuvering the vehicle in order to reach the destination location safely. In order to do so, planner system 102 may generate and send instructions that cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, planner system 102 may also control the drivetrain of the vehicle in order to maneuver the vehicle autonomously.

Figure 2:
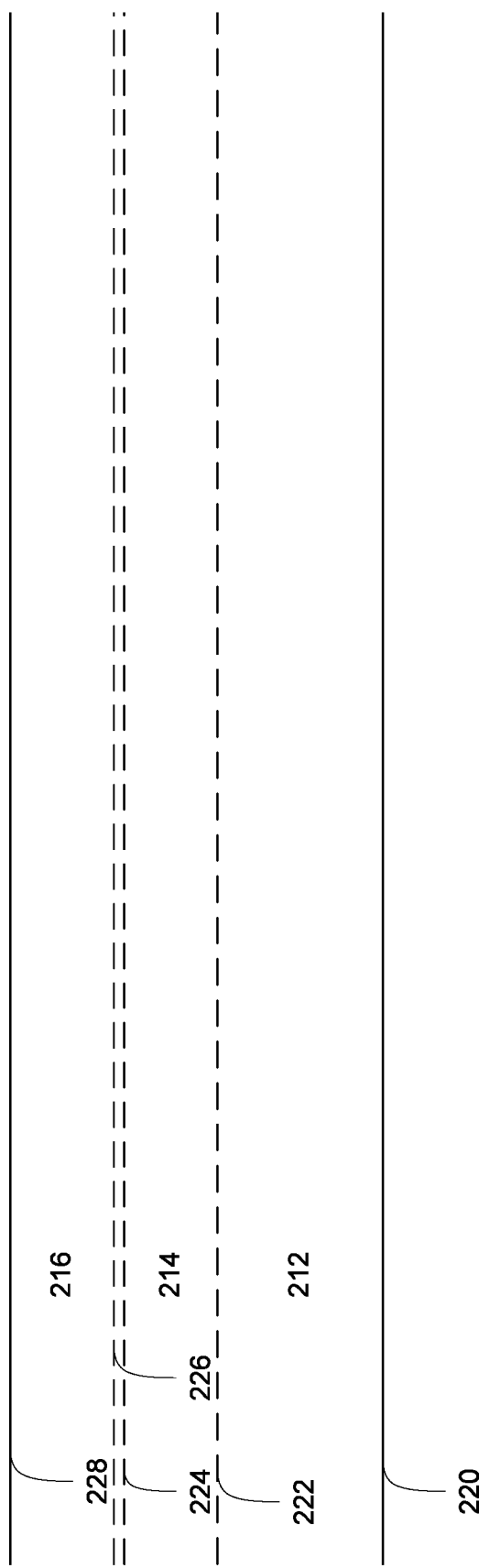
FIG. 2 is an example representation of detailed map information in accordance with aspects of the disclosure.

FIG. 2 is an example of map information 200 for a section of roadway. The map information 200 includes information identifying the shape, location, and other characteristics of various road features. In this example, the map information includes three lanes 212, 214, 216 bounded by curb 220, lane lines 222, 224, 226, and curb 228. Lanes 212 and 214 have the same direction of traffic flow (in an eastward direction), while lane 216 has a different traffic flow (in a westward direction). In addition, lane 212 is significantly wider than lane 214, for instance to allow for vehicles to park adjacent to curb 220. Although the example of map information includes only a few road features, for instance, curbs, lane lines, and lanes, given the nature of the roadway, the map information 200 may also identify various other road features such as traffic signal lights, crosswalks, sidewalks, stop signs, yield signs, speed limit signs, road signs, etc. Although not shown, the detailed map information may also include information identifying speed limits and other legal traffic requirements as well as historical information identifying typical and historical traffic conditions at various dates and times.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of a first configuration for vehicle 100. As can be seen in these figures, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Vehicle 100 also includes sensors of the perception system 172. For example, housing 314 may include one or more laser devices for having 360 degree or narrower fields of view and one or more camera devices. Housings 316 and 318 may include, for example, one or more radar and/or sonar devices. The devices of the perception system may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the planner system 102.

Figure 3A:
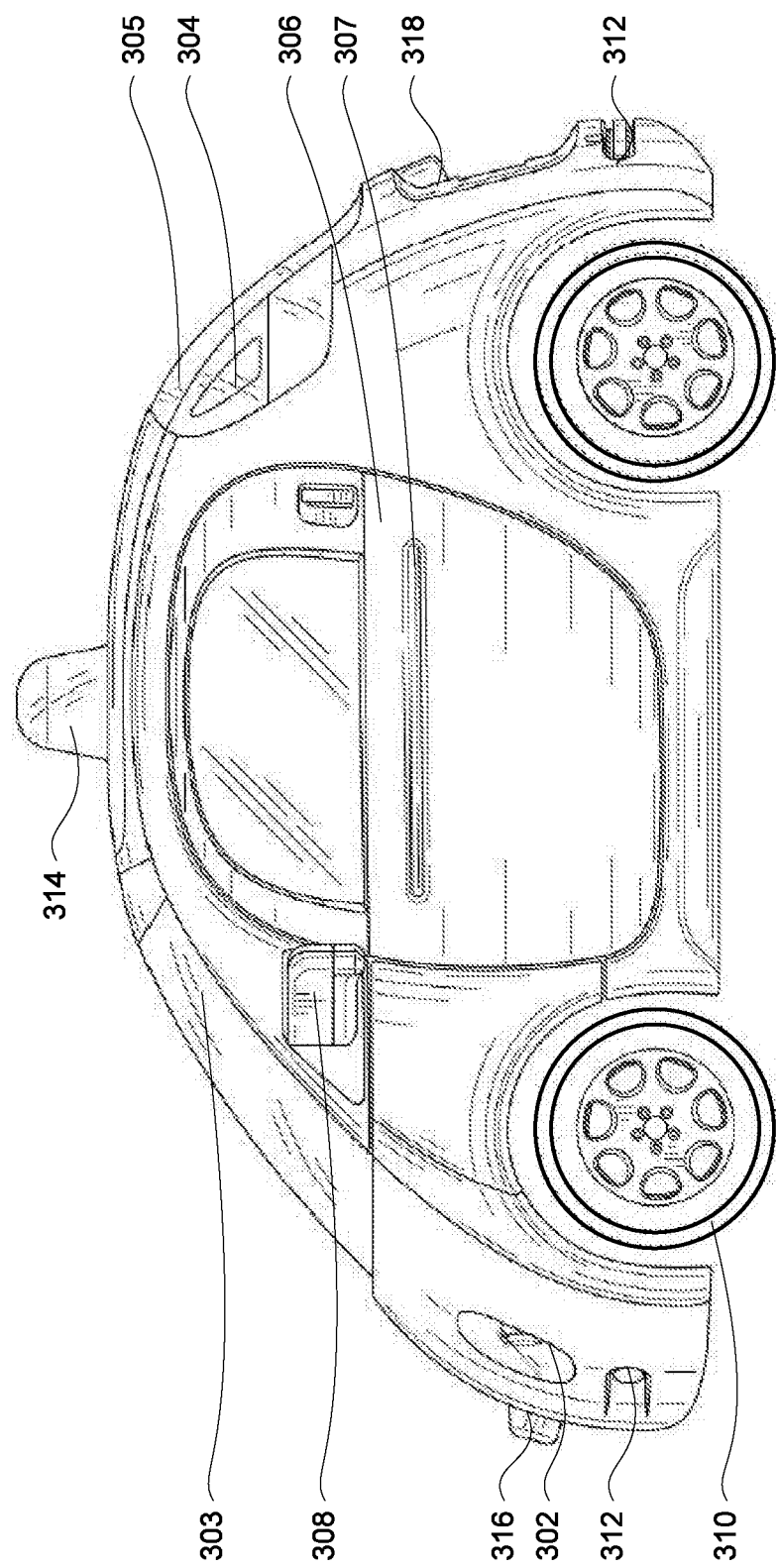
Figure 3D:
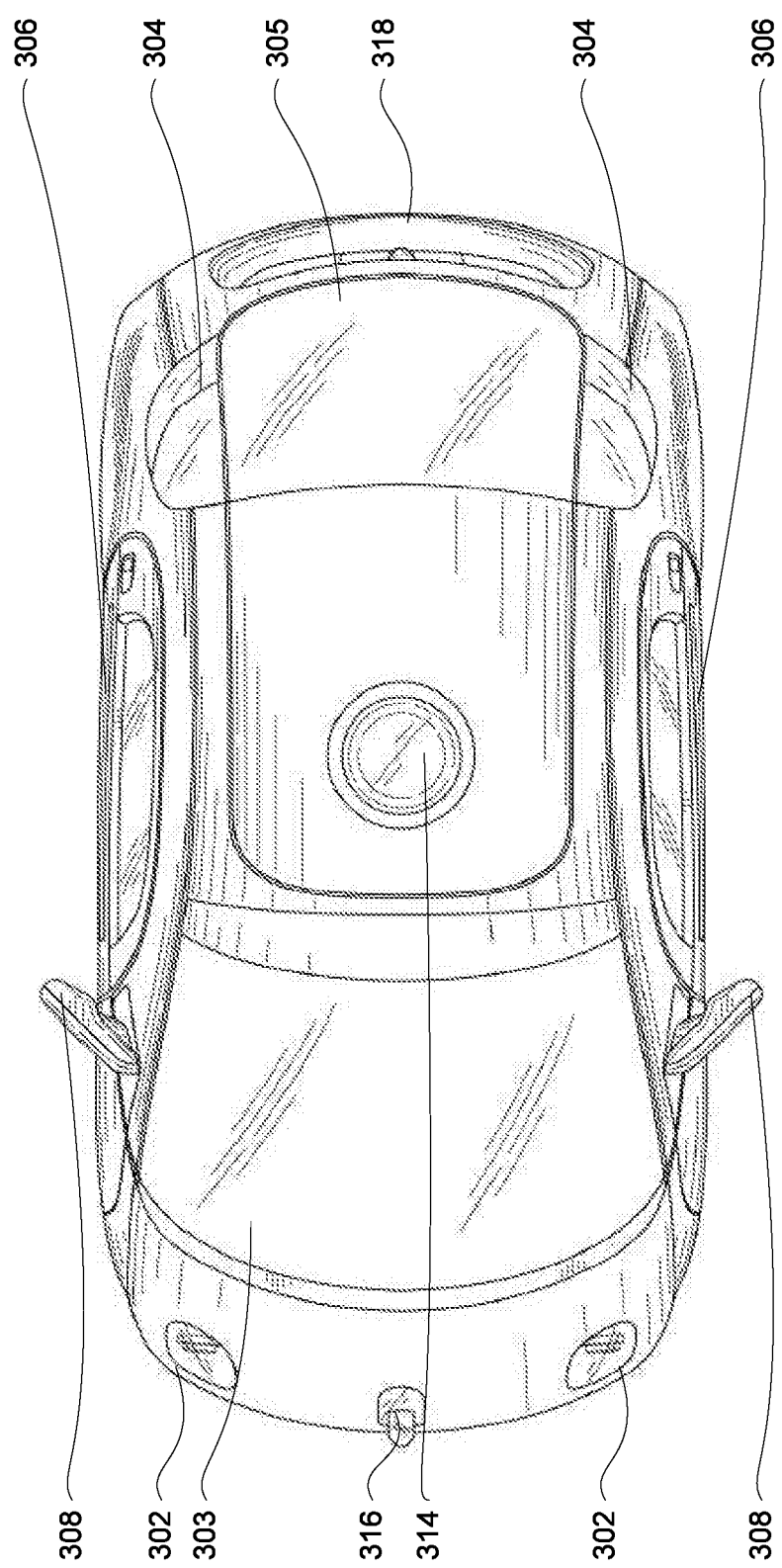
Figure 3E:
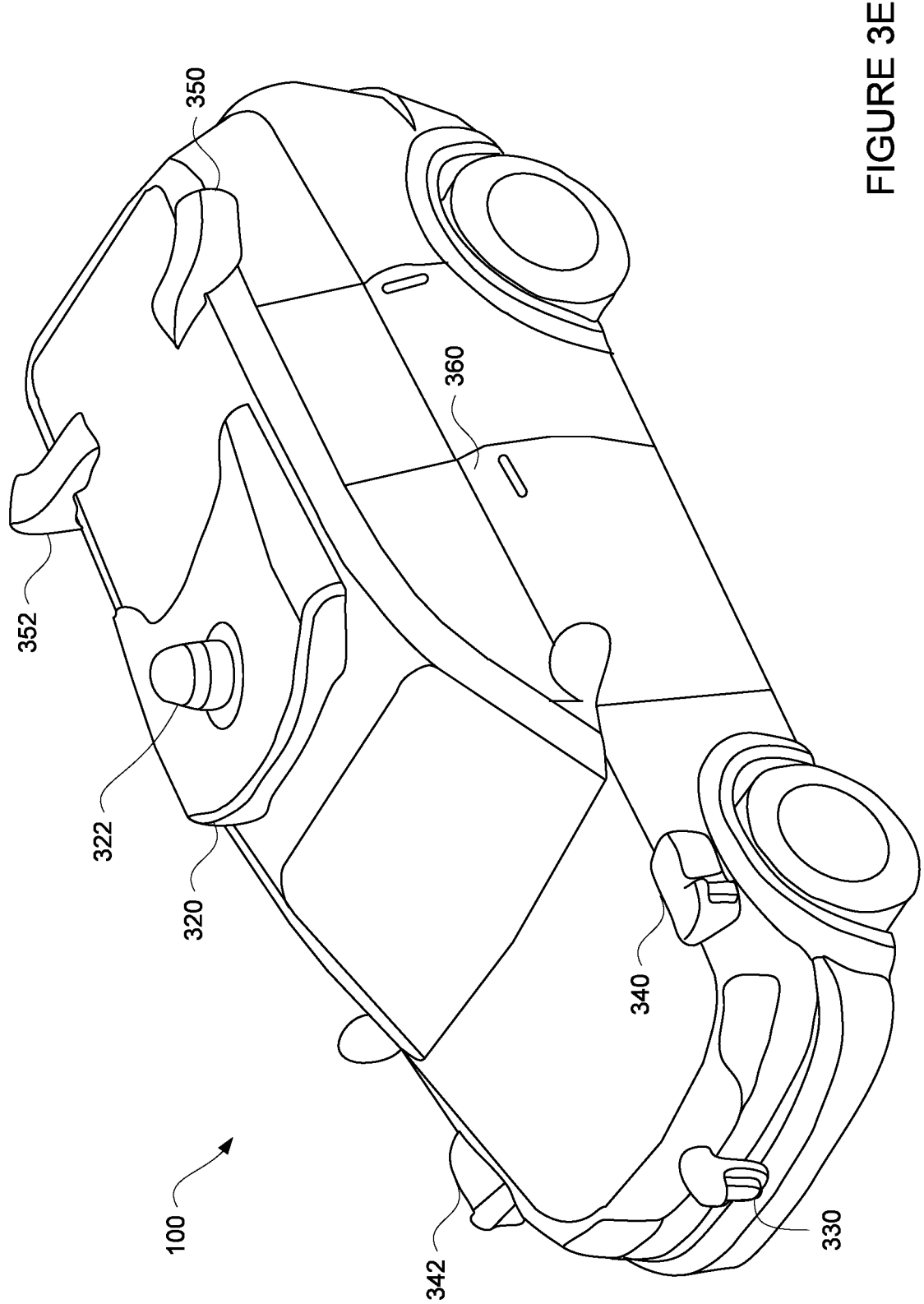
FIG. 3E is an example external view of a vehicle in accordance with aspects of the disclosure.

FIG. 3E is a second example configuration for vehicle 100. In this example, roof-top housing 320 and dome housing 322 may include a lidar sensor as well as various cameras and radar units. In addition, housing 330 located at the front end of vehicle 100 and housings 340, 342 on the driver's and passenger's sides of the vehicle may each store a lidar sensor. For example, housing 340 is located in front of driver door 360. Vehicle 100 also includes housings 350, 352 for radar units and/or cameras also located on the roof of vehicle 100. Additional radar units and cameras (not shown) may be located at the front and rear ends of vehicle 100 and/or on other positions along the roof or roof-top housing 320.

Figure 4:
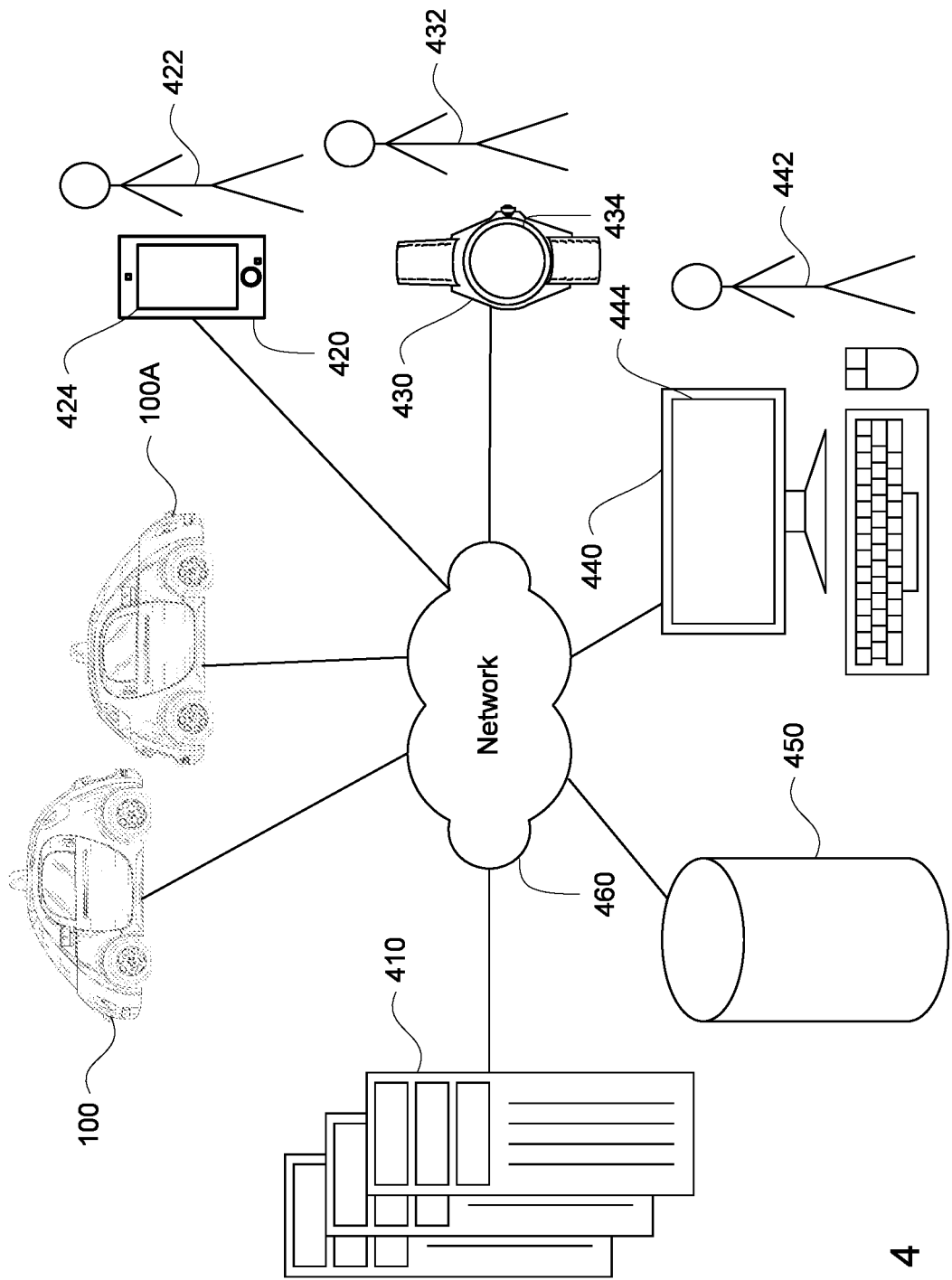
FIG. 4 is an example pictorial diagram of a system in accordance with aspects of the disclosure.
Figure 5:
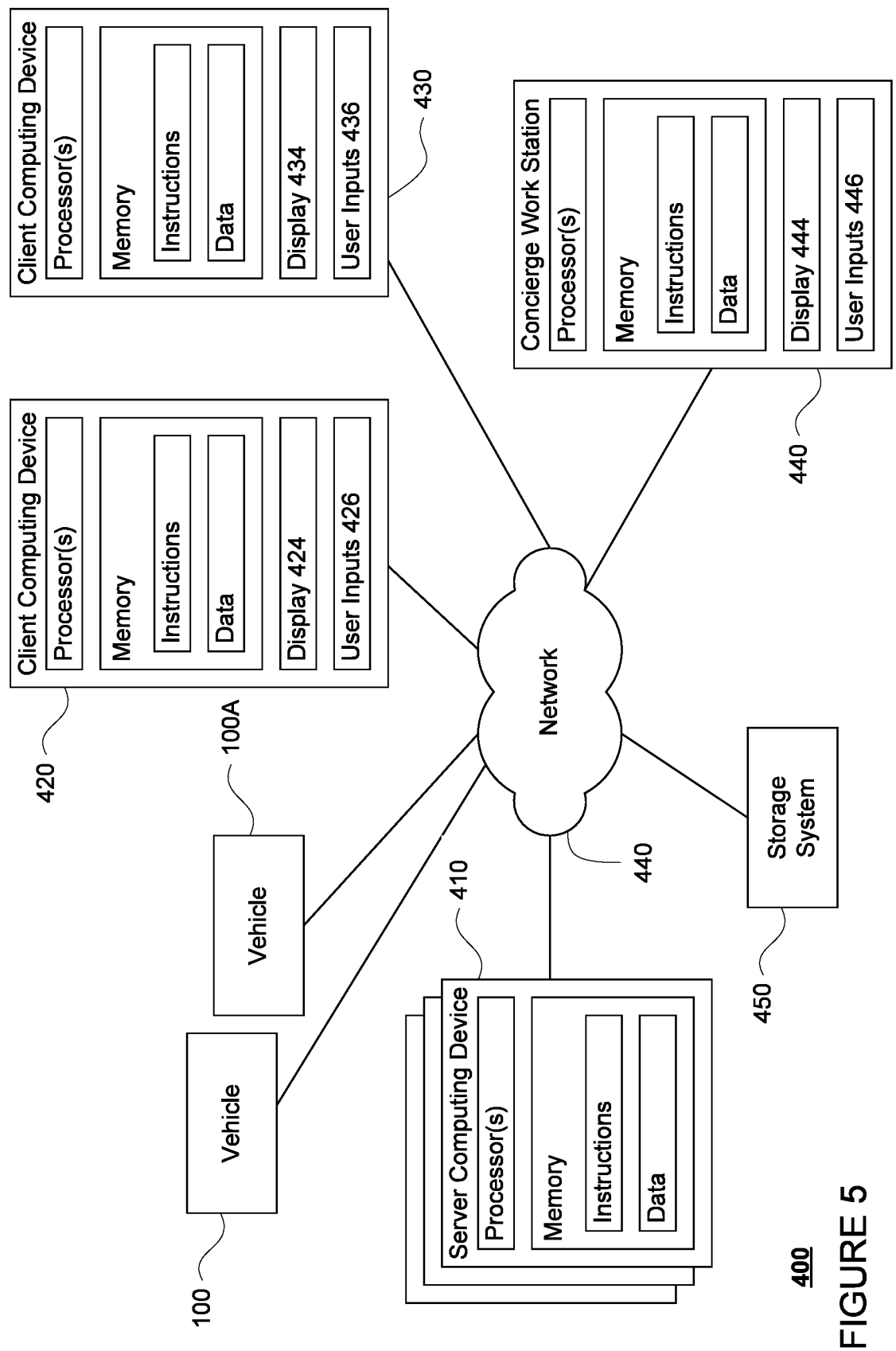
FIG. 5 is an example functional diagram of a system in accordance with aspects of the disclosure.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicles respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be concierge work station used by an administrator to provide concierge services to users such as users 422 and 432. For example, a concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
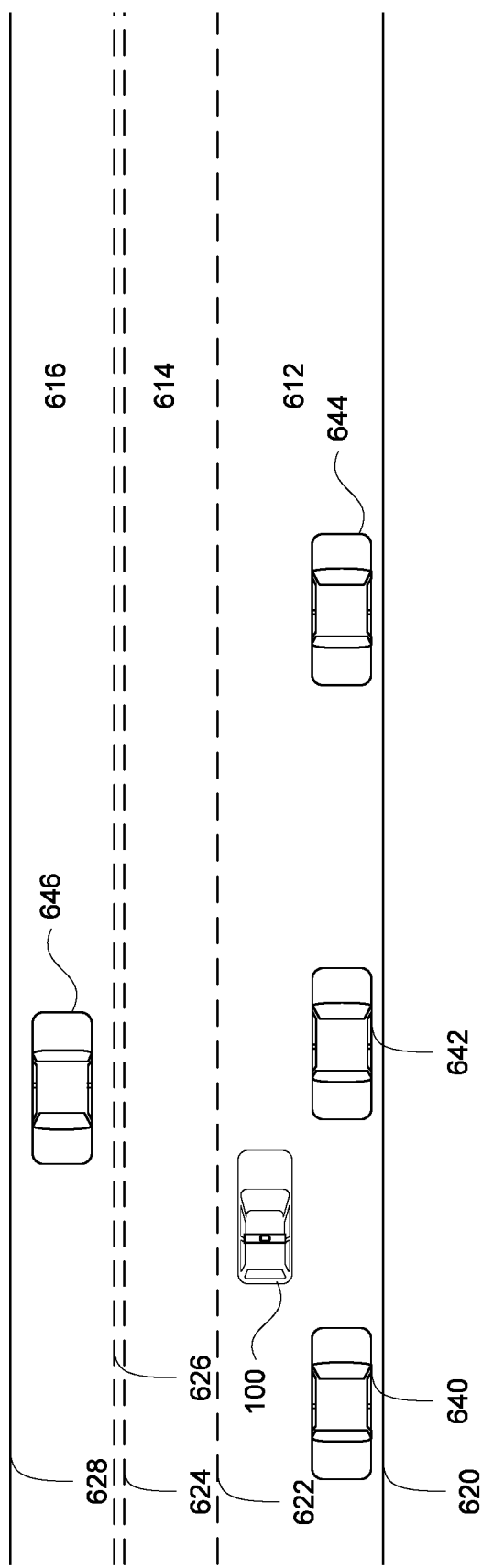
FIG. 6 is an example of a vehicle being maneuvered by planner system on roadway in accordance with aspects of the disclosure.

FIG. 6 is an example view of vehicle 100 driving along a roadway 610 corresponding to roadway 210 of FIG. 2. In that regard, lanes 612, 614, 616 correspond to the shape and location of lanes 212, 214, 216, curbs 620, 628 correspond to the shape and location of curb 220, and lane lines 622, 624, 626 correspond to the shape and location of lane lines 222, 224, 226, and curb 228. In this example, vehicle 100 is traveling in lane 612. Vehicles 640, 642, and 644 are parked within lane 612 along curb 620, while vehicle 646 is moving in lane 616.

Figure 7:
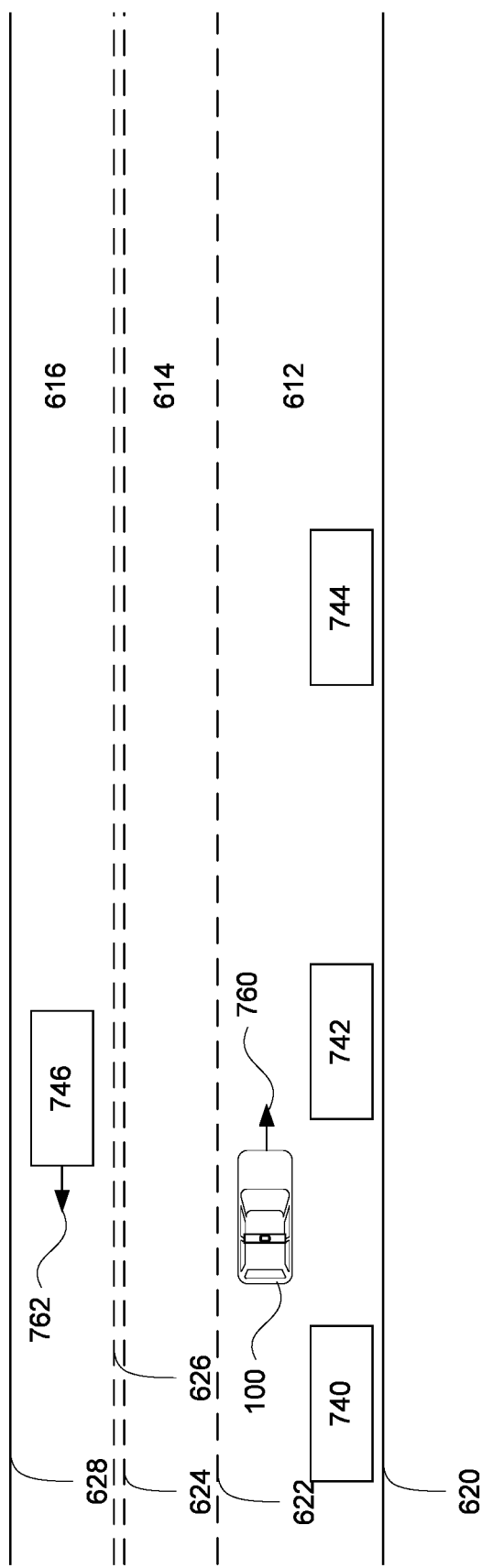
FIG. 7 is an example of sensor data from a perception system and a representation of a vehicle in accordance with aspects of the disclosure.

As the vehicle moves along lane 612, the perception system 172 provides the computing devices with sensor data regarding the shapes and location of objects, such as curbs 620, 628, lane lines 622, 624, 624, as well as vehicles 640, 642, 644, 646. FIG. 7 depicts sensor data perceived by the various sensors of the perception system 172 when vehicle 100 is in the situation as depicted in FIG. 6 in combination with other information available to the computing devices 110. In this example, vehicles 640, 642, 644, 646, are represented by bounding boxes 740, 742, 744, 746 as provided by the perception system 172 to the computing devices 110. Of course, these bounding boxes represent merely a volume of space within which data points corresponding to an object are at least approximately bounded within. In addition, the actual heading of vehicle 100 and estimated heading of bounding box 746 are represented by arrows 760 and 762, respectively. As bounding boxes 740, 742, 744 appear to be moving very slowly or not at all, the computing devices 110 may determine that the objects represented by these bounding boxes are parked along curb 620.

Figure 8:
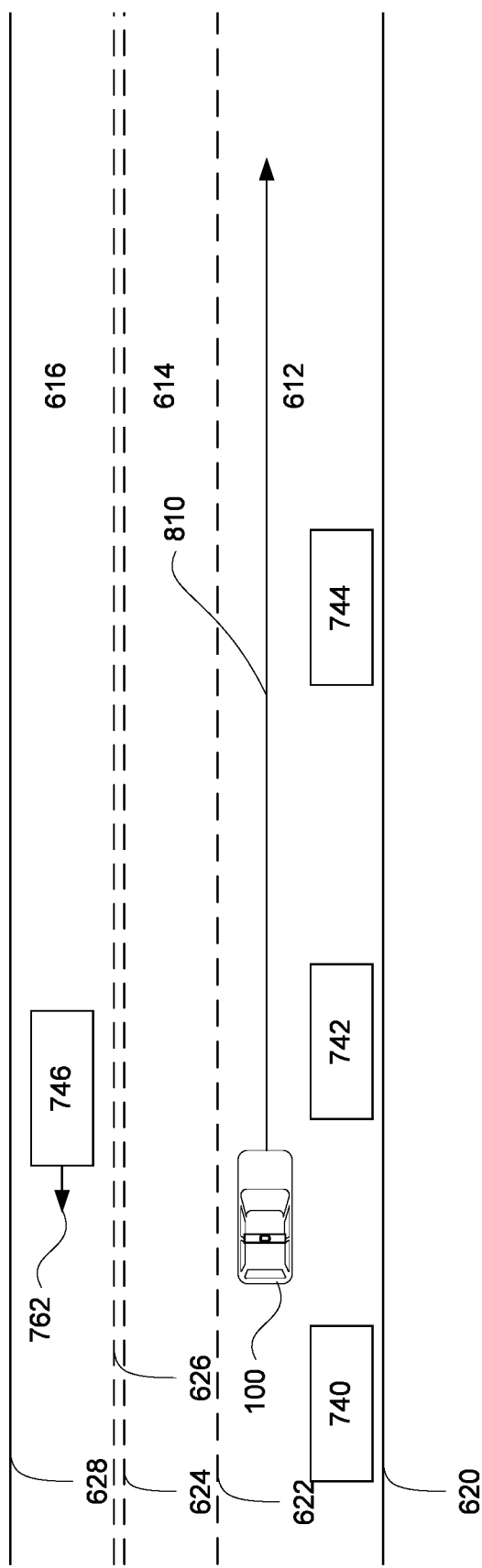
FIG. 8 is an example of sensor data from a perception system, a trajectory, and a representation of a vehicle in accordance with aspects of the disclosure.

The planner system 102 may maneuver the vehicle 100 between two locations as described above. As part of this, the planner system 102 may also use information from the navigation system to identify a trajectory to follow in order to reach a destination. As noted above the planner system 102 may use information from the perception system 172, positioning system 170, and the one or more measuring devices 176 to determine a trajectory and corresponding commands for the vehicle's actuators in order to follow the route. For instance, in FIG. 8, the planner system 102 may have determined that the vehicle should follow a trajectory 810 for the next few seconds.

Figure 9:
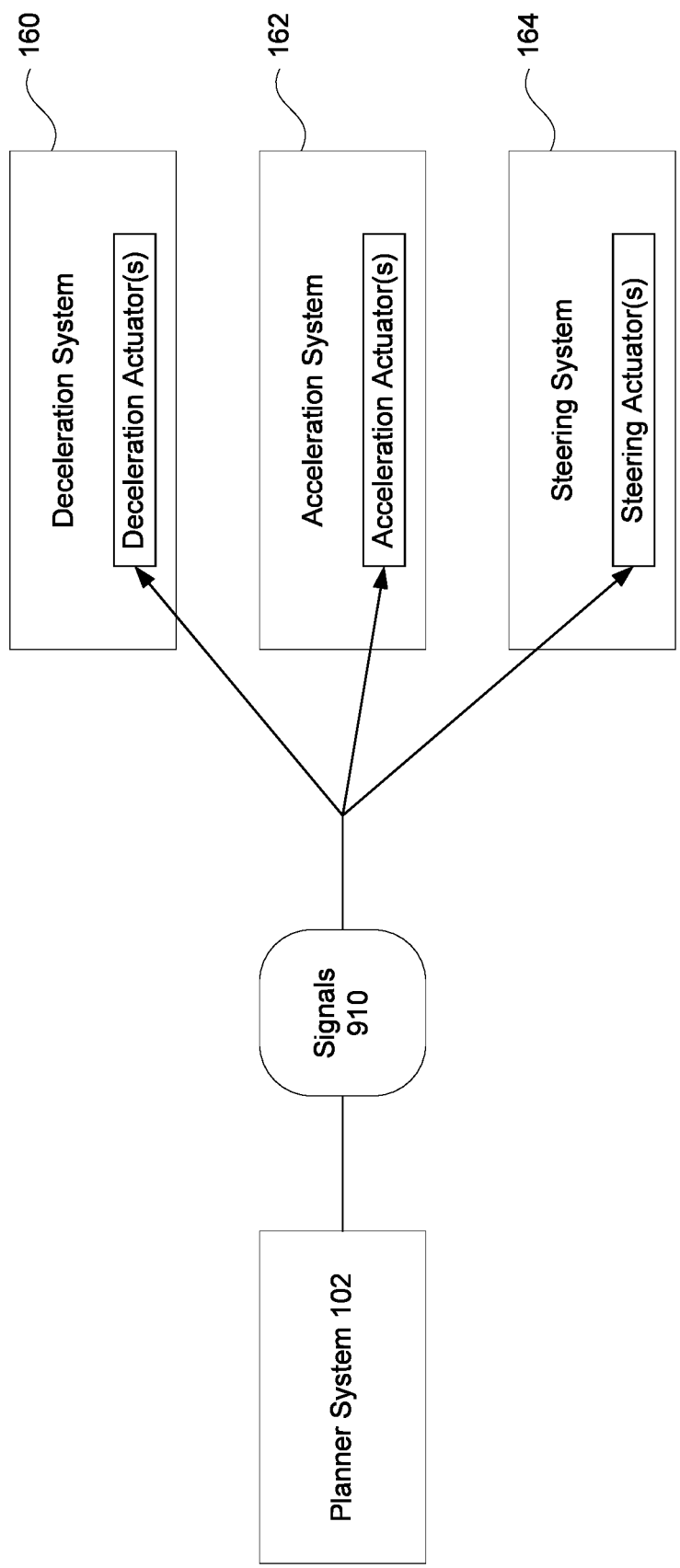
FIG. 9 is an example functional diagram in accordance with aspects of the disclosure.

The planner system 102 may then send signals to command the actuators of the steering, acceleration, and deceleration systems to control the vehicle in order to follow the trajectory. For instance, as shown in FIG. 9, computing devices 110 send signals 910 to each of the one or more deceleration actuators of the deceleration system 160, one or more acceleration actuators of the acceleration system 162, and one or more steering actuators of the steering system 164 as needed in order to follow trajectory 810. These signals may indicate an absolute value of the acceleration, deceleration, and/or orientation of the vehicle required or alternatively, an amount of change needed. The actuators, in turn, may cause the vehicle to control the orientation, acceleration, and deceleration of the vehicle according to the commands to follow the trajectory.

Again, as these messages are sent to the acceleration, deceleration, and steering systems, the messages may be monitored by the computing device 110. At the same time, the computing device 110 may monitor signals sent to and by the planner system 102 as well as signals from the one or more measuring devices 176, and various system of vehicle 100. For example, the computing device 110 may monitor messages from the perception system 172 to the planner system 102, messages from the planner system 102 to the acceleration system, messages from the planner system 102 to the deceleration system, messages from the planner system 102 to the steering system. In addition, the computing devices 110 may monitor the condition of the position of the accelerator input (accelerator pedal), torque signals, tires or tire rotation, wheel or wheel rotation, axles, etc. as well as diagnostic signals from the engine or motor and other system errors or malfunction indicators such as a check engine light, etc. This may provide the planner system with information about the current state of the vehicle's acceleration and steering. This may include, for example, the current acceleration or orientation of the vehicle as well as the current change in acceleration or orientation of the vehicle.

The computing device 110 may then compare the current state of the vehicle's acceleration and/or steering with the commands generated by the planner system 102 to determine if there is a mismatch. For instance, if the difference between the current state of the vehicle's acceleration or orientation and that required by the current commands is greater than a threshold value, the computing device 110 may determine that there is a mismatch. An example of a mismatch for acceleration may include more than 1 meter per second per second less acceleration than desired over a period of 5 seconds. An example of a mismatch for steering may include more than 15 degrees of divergence between commanded steering angle and actual steering angle or more than 0.5 meters of sideways difference between intended position in a lane and actual measured distance. Of course, other more finely tuned criteria may also be used.

If there is a mismatch, the computing device 110 may detect a failure. Once detected, the computing device 110 may send a signal to the control computing devices of the planner system 102. This signal may also identify if there is "too much" acceleration or change in acceleration or "not enough" acceleration or change in acceleration. Similarly, the signal may identify if there is "too much" change in the vehicle's orientation or "not enough" change in the vehicle's orientation. More particularly, the signal may identify errors in one or more of acceleration, speed, position (both longitudinally and laterally), yaw (direction in which the vehicle is pointing), etc.

The computing devices 110 may use this information to determine how to react to the error. For example, if there is too much acceleration, the control computing devices may send a signal to change the current gear (drive or 1st, 2nd, 3rd, etc.) of the vehicle's drive train to neutral, for instance by moving a gear control or gear shifter to neutral or a neutral state in order to disengage the vehicle's transmission, or to turn off the vehicle's ignition to "kill" the engine or motor. As a result, the vehicle will have no acceleration. In the steering example, the computing devices may respond by automatically causing the vehicle to stop as quickly as possible. Alternatively, if available, the computing devices 110 may use a fallback or secondary steering system or motor.

Figure 10:
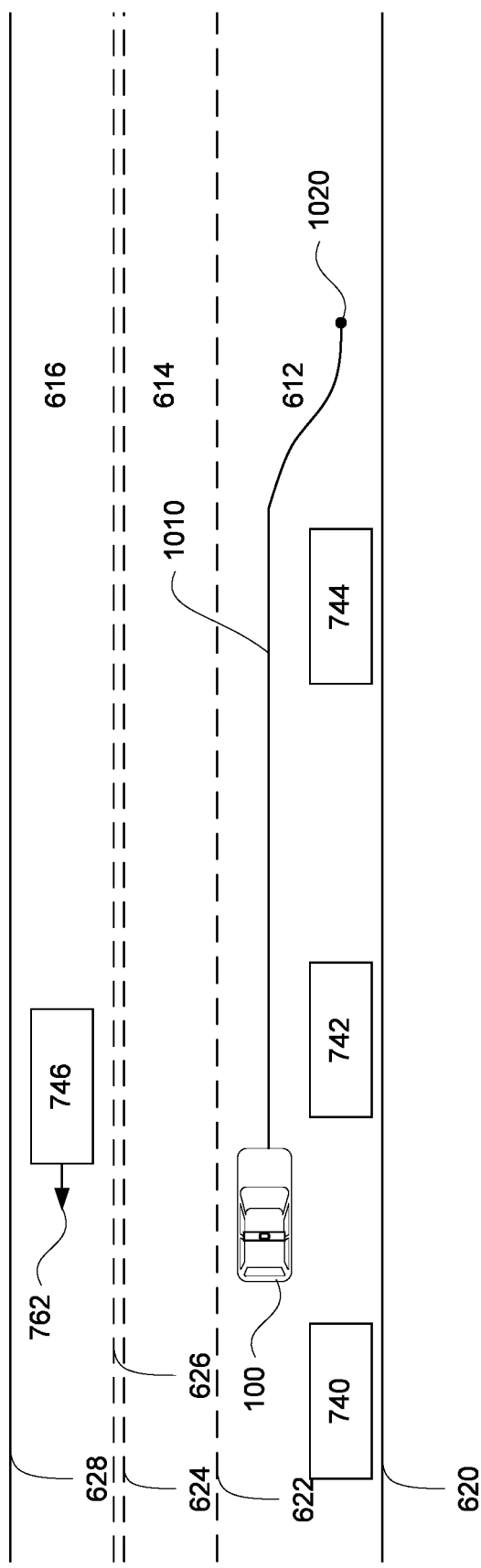
FIG. 10 is an example of sensor data from a perception system, a trajectory, and a representation of a vehicle in accordance with aspects of the disclosure.

When this is the case, the control computing devices may also change the planner system's planning behavior. This may include generating a plan for stopping the vehicle safely which does not include any acceleration or steering depending upon the situation. As examples, the behavior changes may include adding rules or assumptions that the planner does not otherwise need to follow such as that there is no acceleration available, the vehicle is able to be steered and slowed down, the vehicle cannot change lanes except to move off of a roadway, the vehicle must avoid intersections, the vehicle cannot cross railroad tracks, etc. Similarly, if there is a failure of the steering system, the behavior changes may include adding rules or assumptions that the planner does not otherwise need to follow such as that there is no steering available, the vehicle is able to be accelerated and slowed down, the vehicle cannot change lanes, the vehicle must avoid intersections, the vehicle must stay in a current lane, the vehicle cannot cross railroad tracks, etc. For example, if there is not enough acceleration or change in acceleration, the vehicle may have completely lost its ability to accelerate. In other words, there may be no propulsion. Again, when this is the case, the control computing devices may send instructions to the planner system to change the planner system's behavior. This may include generating a plan for stopping the vehicle safely which does not include any acceleration (but may include deceleration) as discussed above. For instance, turning to FIG. 10, once the planner system 102's behavior has changed, in the example of a lack of propulsive ability (no acceleration), rather than following trajectory 810 (depicted in FIG. 8), the planner system 102 may instead generate trajectory 1010 in order to pull vehicle 100 to the side of lane 612 and stop at stopping point 1020 while avoiding both of the objects represented by bounding boxes 742 and 744. Alternatively, if given the current speed of the vehicle 100, the vehicle is unable to pass the object represented by bounding box 744, the planner system 102 may instead follow a trajectory (not shown) to pull between the objects represented by bounding boxes 742 and 744 and stop.

Figure 11:
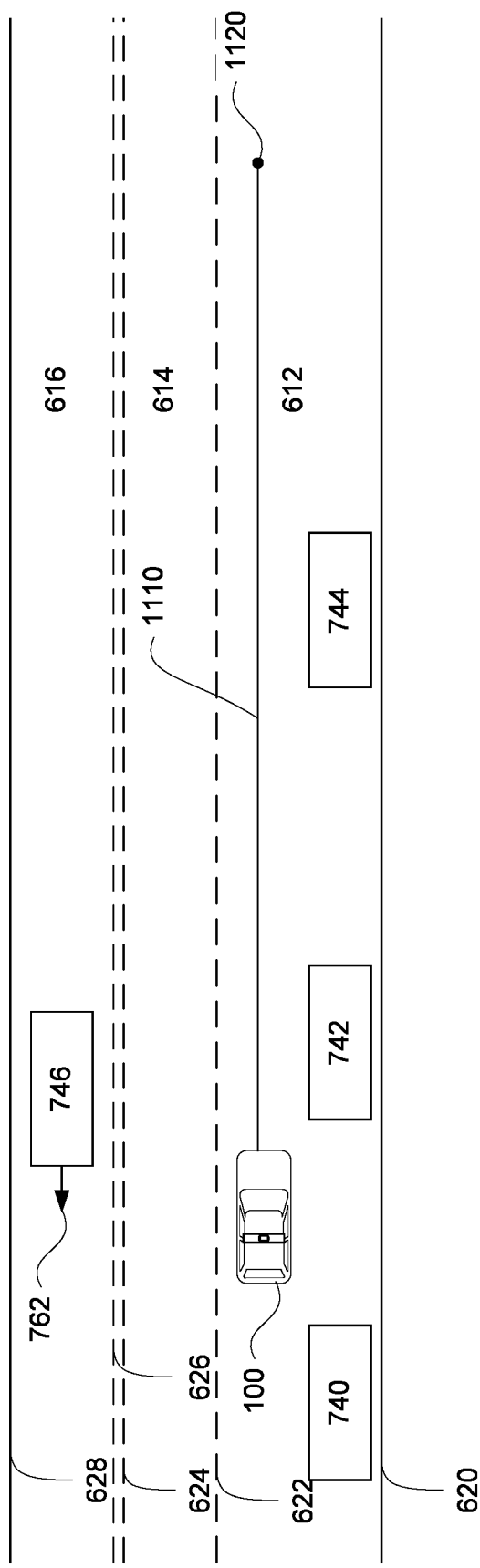
FIG. 11 is an example of sensor data from a perception system, a trajectory, and a representation of a vehicle in accordance with aspects of the disclosure.

Another example change in behavior may include generating a plan for stopping the vehicle safely which does not include any change in orientation of the vehicle (but may include acceleration or deceleration) as discussed above. For instance, turning to FIG. 11, once the planner system 102's behavior has changed, in the example of a lack of steering capability (the vehicle cannot change it's orientation), rather than following trajectory 810 (depicted in FIG. 8), the planner system 102 may instead generate trajectory 1110 in order to bring vehicle 100 to a stop at stopping point 1120 within lane 612. At the same time, the planner system 102 may cause the signaling system 166 to activate the vehicle's hazard lights to indicate to other vehicles that there is a problem.

In another example, the planner system's behavior may require that the steering system cannot be used to steer the vehicle, but may generate plans with some steering using other systems. For instance, the computing devices 110 may be able to control the heading of the vehicle using a secondary steering system or by using individual brakes to steer (i.e. using only the left rear brake to steer left or the right rear brake to steer right. In this regard, the vehicle may be able to take some "gentle" turns until the vehicle comes to a complete stop.

In some instances, rather than automatically changing the behavior of the planner system 102, the control computing devices may take some other action. For instance, when the signal from the monitor computing device indicates that there is not enough acceleration or change in acceleration, the control computing devices may attempt to increase acceleration. This may prevent the vehicle from stopping without propulsion where unnecessary, for instance, where the error was transient. At the same time, however, in order to ensure the safety of passengers, the control computing devices may send a request for help, for instance by sending a signal requesting assistance to client computing device 440 over network 460, and/or pull the vehicle over safely in case the error reemerges. A concierge may respond by sending instructions to the vehicle and/or speaking to the passengers over video or audio in order to reassure and assist the passengers.

In another example, when the signal from the monitor computing device indicates that there is too much acceleration or change in acceleration, the control computing devices may attempt to decrease acceleration. Again, this may prevent the vehicle from shutting off the ignition, disengaging the transmission, and stopping without propulsion where unnecessary, for instance, where the error was transient. At the same time, however, in order to ensure the safety of passengers, the control computing devices may send a request for help, for instance by sending a signal requesting assistance to client computing device 440 over network 460, and/or pull the vehicle over safely in case the error reemerges. And again, a concierge may respond by sending instructions to the vehicle and/or speaking to the passengers over video or audio in order to reassure and assist the passengers.

In some instances, the control computing devices may change the behavior of the planner system 102 even without receiving a corresponding signal from the monitoring computing device 110. For instance, if the measuring devices 176, acceleration system 162, steering system 164, or power system 174 report a major fault at one of these systems which would indicate the loss of propulsive or steering ability of the vehicle, the control computing device may be configured to automatically being generating a plan for stopping the vehicle without acceleration or steering as the case may be. Similarly, if the monitoring computing device is incorporated into the planning system 102 or part of the control computing devices, the control computing devices may change the behavior of the planner system or take some other action as described above automatically. Alternatively, the control computing device may regularly or continually generate alternative plans for stopping the vehicle without propulsion, breaking or acceleration, for instance, as part of a redundancy system to ensure the safety of the vehicle, any passengers, and any other objects.

Figure 12:
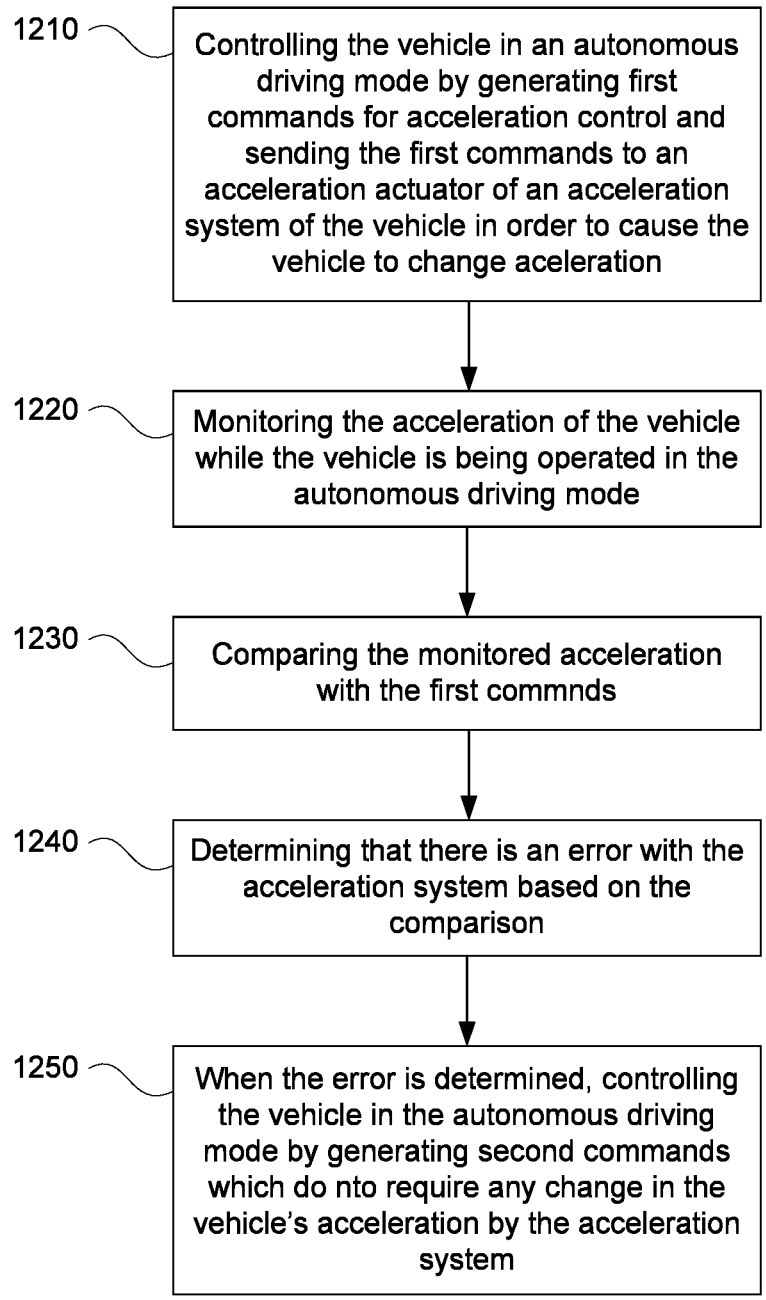
FIG. 12 is a flow diagram in accordance with aspects of the disclosure.

FIG. 12 is a flow diagram 1200 that may be performed by one or more processors, such as one or more processors of control computing devices of the planner system 102 and/or computing device 110 in order to detect propulsion failures and stop the vehicle safely. For instance, at block 1210, the vehicle is controlled in an autonomous driving mode by generating first commands for acceleration control and sending the first commands to an acceleration actuator of an acceleration system of the vehicle in order to cause the vehicle to change acceleration. At block 1220, the acceleration of the vehicle is monitored while the vehicle is being operated in an autonomous driving mode. The monitored acceleration is compared with the first commands at block 1230. An error is determined with the acceleration system based on the comparison at block 1240. At block 1250, when the error is determined, the vehicle is controlled in the autonomous driving mode by generating second commands, based on the determining, which do not require any change in the vehicle's acceleration by the acceleration system.

Figure 13:
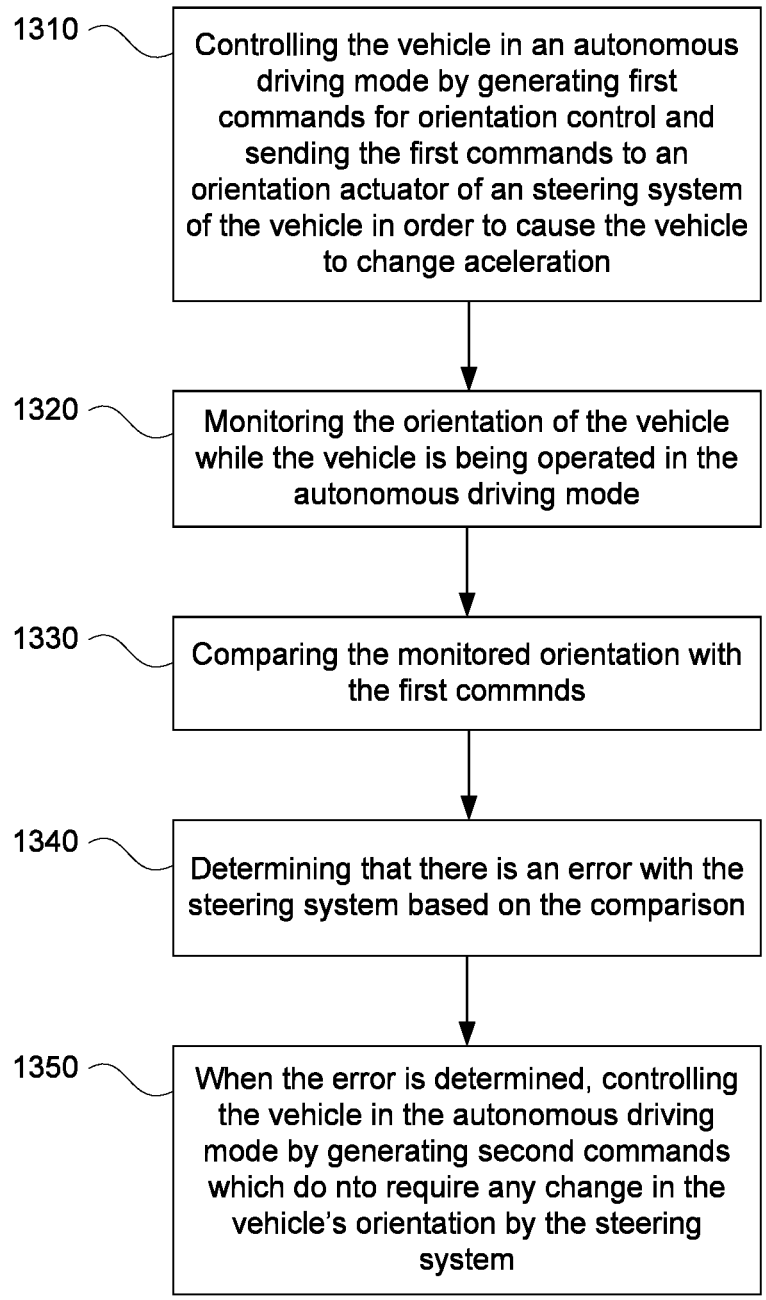
FIG. 13 is another flow diagram in accordance with aspects of the disclosure.

FIG. 13 is a flow diagram 1300 that may be performed by one or more processors, such as one or more processors of control computing devices of the planner system 102 and/or computing device 110 in order to detect propulsion or steering failures and stop the vehicle safely. For instance, at block 1310, the vehicle is controlled in an autonomous driving mode by generating first commands for steering control and sending the first commands to a steering actuator of a steering system of the vehicle in order to cause the vehicle to change orientation. At block 1320, the orientation of the vehicle is monitored while the vehicle is being operated in an autonomous driving mode. The monitored orientation is compared with the first commands at block 1330. An error is determined with the steering system based on the comparison at block 1340. At block 1350, when the error is determined, the vehicle is controlled in the autonomous driving mode by generating second commands which do not require any change in the vehicle's orientation by the steering system.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for stopping a vehicle, the system comprising:
one or more processors of one or more computing devices configured to:
control, the vehicle in an autonomous driving mode by generating first commands for acceleration control and sending the first commands to an acceleration actuator of an acceleration system of the vehicle in order to cause the vehicle to accelerate;
monitor acceleration of the vehicle while the vehicle is being operated in an autonomous driving mode;
compare the monitored acceleration with the first commands;
determine that there is an error with the acceleration system based on the comparison; and
when the error is determined, control the vehicle in the autonomous driving mode by generating second commands which do not require any acceleration by the acceleration system.

2. The system of claim 1, wherein one of the one or more computing devices is a monitor computing device configured to perform the monitoring and the determining, and another of the one or more computing devices is a control computing device configured to perform the controlling the vehicle in the autonomous driving mode by generating the first commands and the controlling the vehicle in the autonomous driving mode by generating the second commands.

3. The system of claim 2, wherein the one or more processors are further configured to: use the comparison to generate a signal indicating the error; and
send the signal to the control computing device.

4. The system of claim 3, wherein the signal indicates that there is too much acceleration.

5. The system of claim 4, wherein the one or more processors are further configured to:
receive the signal; and
in response to receiving the signal, turn off an ignition of the vehicle.

6. The system of claim 3, wherein the one or more processors are configured to:
receive the signal; and
in response to receiving the signal, move a gear control to a neutral state thereby disengaging a transmission of the vehicle.

7. The system of claim 3, wherein the signal indicates that there is not enough acceleration.

8. The system of claim 1, wherein the one or more processors are further configured to:
determine a first trajectory for maneuvering the vehicle by a planning system of the vehicle, wherein generating the first commands is based on the first trajectory, and when the error is detected, change a planning behavior of the planning system.

9. The system of claim 8, wherein the one or more processors are further configured to, after changing the planning behavior of the planning system, determine a second trajectory for maneuvering the vehicle according to the changed planning behavior, and wherein the second commands are generated based on the second trajectory.

10. The system of claim 1, further comprising the vehicle.

11. A system for stopping a vehicle, the system comprising:
one or more processors of one or more computing devices configured to:
control the vehicle in an autonomous driving mode by generating first commands for steering control and sending the first commands to a steering actuator of a steering system of the vehicle in order to cause the vehicle to change orientation;
monitor orientation of the vehicle while the vehicle is being operated in an autonomous driving mode;
compare the monitored orientation with the first commands;
determine that there is an error with the steering system based on the comparison; and
when the error is determined, control the vehicle in the autonomous driving mode by generating second commands which do not require any change in the vehicle's orientation by the steering system.

12. The system of claim 11, wherein one of the one or more computing devices is a monitor computing device, and another of the one or more computing devices is a control computing device configured to perform the controlling the vehicle in the autonomous driving mode by generating the first commands and the controlling the vehicle in the autonomous driving mode by generating the second commands.

13. The system of claim 12, wherein the one or more processors are further configured to:
use the comparison to generate a signal indicating the error; and
send the signal to the one or more control computing devices.

14. The system of claim 11, wherein the one or more processors are further configured to:
determine a first trajectory for maneuvering the vehicle by a planning system of the vehicle, wherein generating the commands is based on the first trajectory; and
when the error is detected, change a planning behavior of the planning system.

15. The system of claim 14, wherein the one or more processors are further configured to, after changing the planning behavior of the planning system, determine a second trajectory for maneuvering the vehicle according to the changed planning behavior, and wherein the second commands are generated based on the second trajectory.

16. The system of claim 11, wherein the one or more processors are further configured to:
control, the vehicle in an autonomous driving mode by generating third commands for acceleration control and sending the first commands to an acceleration actuator of an acceleration system of the vehicle in order to cause the vehicle to accelerate;
monitor acceleration of the vehicle while the vehicle is being operated in an autonomous driving mode;
compare the monitored acceleration with the third commands;
determine that there is an error with the acceleration system based on the comparison; and
when the error is determined, control the vehicle in the autonomous driving mode by generating fourth commands which do not require any acceleration by the acceleration system.

17. The system of claim 16, and wherein the one or more processors are further configured to use the comparison to generate a signal indicating the error, wherein the signal indicates that there is too much acceleration.

18. The system of claim 17, wherein the one or more processors are further configured to:
receive the signal; and
in response to receiving the signal, turn off an ignition of the vehicle.

19. The system of claim 17, wherein the one or more processors are configured to:
receive the signal; and
in response to receiving the signal, move a gear control to a neutral state thereby disengaging a transmission of the vehicle.

20. The system of claim 11, further comprising the vehicle.

\* \* \* \* \*